(12) United States Patent
Coates et al.

(10) Patent No.: US 7,510,005 B2
(45) Date of Patent: Mar. 31, 2009

(54) CONTROLLING PRESSURE AND STATIC CHARGE BUILD UP WITHIN AN ANNULAR VOLUME OF A WELLLBORE

(75) Inventors: Don M. Coates, Sante Fe, NM (US); John M. Daniel, Germantown, TN (US)

(73) Assignees: Chevron U.S.A. Inc., San Ramon, CA (US); Lucite International, Cordova, TN (US)

( * ) Notice: Subject to any disclaimer, the term of this patent is extended or adjusted under 35 U.S.C. 154(b) by 0 days.

(21) Appl. No.: 12/004,416

(22) Filed: Dec. 21, 2007

(65) Prior Publication Data
US 2008/0223576 A1 Sep. 18, 2008

Related U.S. Application Data

(63) Continuation of application No. 11/593,608, filed on Nov. 7, 2006, now abandoned, and a continuation-in-part of application No. 11/282,424, filed on Nov. 18, 2005.

(51) Int. Cl.
*E21B 33/13* (2006.01)
*E21B 43/12* (2006.01)
*E21B 36/00* (2006.01)

(52) U.S. Cl. .......... 166/288; 166/291; 166/295; 166/302; 507/224; 507/238; 507/240; 507/265

(58) Field of Classification Search .......... 166/285, 166/288, 291, 294, 295, 300, 302, 364, 901; 507/224, 238, 240, 265
See application file for complete search history.

(56) References Cited

U.S. PATENT DOCUMENTS

| | | | |
|---|---|---|---|
| 2,417,816 | A | 2/1947 | Fallon |
| 3,223,761 | A | 12/1965 | Raley |
| 3,352,790 | A | 11/1967 | Sugarman et al. |
| 3,886,075 | A | 5/1975 | Bernardino |
| 3,935,910 | A | 2/1976 | Gaudy et al. |
| 4,184,790 | A | 1/1980 | Bassett |
| 4,417,625 | A | 11/1983 | Hensen et al. |

(Continued)

FOREIGN PATENT DOCUMENTS

WO 1998/57028 12/1998

(Continued)

OTHER PUBLICATIONS

Creel, Prentice and Ron Crook, "Gels, monomer solutions fix pinhole casing leaks", *Oil & Gas Journal* 95(41):44-46 (1997).

(Continued)

*Primary Examiner*—George Suchfield
(74) *Attorney, Agent, or Firm*—Crowell & Moring LLP (57) ABSTRACT

A process is described for replacing at least a portion of the liquid within the annular volume of a casing system within a wellbore with a second liquid. The second liquid comprising at least one polymerizable monomer and at least one antistatic agent to control build up of static charge. The second fluid is preselected to provide a measure of control of the pressure within the annular volume as the fluid within the volume is being heated.

56 Claims, 4 Drawing Sheets

U.S. PATENT DOCUMENTS

| | | | |
|---|---|---|---|
| 4,493,751 | A | 1/1985 | Cherdron et al. |
| 4,883,125 | A | 11/1989 | Wilson et al. |
| 5,514,360 | A | 5/1996 | Sleight et al. |
| 5,866,516 | A | 2/1999 | Costin |
| 5,919,720 | A | 7/1999 | Sleight et al. |
| 6,009,945 | A | 1/2000 | Ricks |
| 6,164,378 | A | 12/2000 | Coronado |
| 6,183,716 | B1 | 2/2001 | Sleight et al. |
| 6,187,839 | B1 | 2/2001 | Eoff et al. |
| 6,457,528 | B1 | 10/2002 | Staudt |
| 6,675,898 | B2 | 1/2004 | Staudt |
| 6,745,844 | B2 | 6/2004 | Henderson |
| 6,780,507 | B2 | 8/2004 | Toreki et al. |
| 6,817,418 | B2 | 11/2004 | Gatherar et al. |
| 6,854,522 | B2 | 2/2005 | Brezinski et al. |
| 7,066,284 | B2 | 6/2006 | Wylie et al. |
| 2002/0139536 | A1 | 10/2002 | Staudt |
| 2004/0069495 | A1 | 4/2004 | Adams et al. |
| 2004/0238178 | A1 | 12/2004 | Laureano et al. |
| 2005/0194114 | A1 | 9/2005 | Vargo, Jr. et al. |
| 2007/0114003 | A1* | 5/2007 | Hermes et al. .............. 166/295 |

FOREIGN PATENT DOCUMENTS

| | | |
|---|---|---|
| WO | 2004/035986 | 4/2004 |
| WO | 2004/038164 | 5/2004 |
| WO | 2005/085586 | 9/2005 |

OTHER PUBLICATIONS

Eoff, Larry and James Griffith, "Acrylate monomer solution stops artesian water, geopressured sand flows", *Oil & Gas Journal* 96(44):89-91 (1998).

Moe, B. and Peter Erpelding, "Annular pressure buildup: What it is and what to do about it", *Deepwater Technology*, pp. 21-23, Aug. 2000.

Oudeman P. and M. Kerem, Transient behavior of annular pressure buildup in HP/HT Wells, Society of Petroleum Engineers 11$^{th}$ Abu Dhabi International Petroleum Exhibition and Conference, SPE 88735, Oct. 2004.

F. Vargo, Jr., et al., "$N_2$ foamed spacers prevent annular pressure buildpu at Marlin", Oil & Gas Journal, pp. 45-49, Dec. 8, 2003.

J.H. Azzola, et al.,"Application of Vacuum Insulated Tubing to Mitigate Annular Pressure Buildup", Society of Petroleum Engineers Annual Technical Conference and Exhibition, SPE 90232, Sep. 2004.

C.P. Leach, et al.,"A New Method for the Relief of Annular Heat-up Pressure", Society of Petroleum Engineers Production Operations Symposium, SPE 25497, Mar. 1993, pp. 819-826.

R. Williamson, et al., "Control of Contained-Annulus Fluid Pressure Buildup", Society of Petroleum Engineers/International Association of Drilling Contractors Conference, SPE/IADC 79875, Feb. 2003.

"Acrylic and Methacrylic Ester Polymers", *Encyclopedia of Polymer Science and Engineering*, 2nd Edition, vol. 1: A to Amorphous Polymers, Table 20, J. Kroschwitz, ed., John Wiley & Sons, Inc. (New York). p. 266 (1985).

D.A. Tildbrook, et al.,"Prediction of Polymerization Shrinkage Using Molecular Modeling", *J. Poly. Sci., Part B: Polymer Physics* 41:528-548 (2003).

T. Loder, et al.,"Prediction of and Effective Preventative Solution for Annular Fluid Buildup on Subsea Completed Wells—Case Study", Society of Petroleum Engineers Annual Technical Conference and Exhibition, SPE 84270, Oct. 2003.

P. Watson, et al.,"An Innovative Approach to Development Drilling in Deepwater Gulf of Mexico", Society of Petroleum Engineers/International Association of Drilling Contractors Conference, SPE/IADC 79809, Feb. 2003.

R.B. Carpenter et al.,"Remediating Sustained Casing Pressure by Forming a Downhole Annular Seal with Low-Melt-Point Eutectic Metal", Society of Petroleum Engineers/International Association of Drilling Contractors Conference, IADC/SPE 87198, Mar. 2004.

G. Robello Samuel, et al., "Multistring Casing Design for Deepwater and Ultradeep HP/HT Wells: A New Approach", Society of Petroleum Engineers/International Association of Drilling Contractors Conference, IADC/SPE 74490, Feb. 2002.

International Search Report mailed May 24, 2007 in corresponding International Application PCT/US06/44608.

* cited by examiner

Figure 4

# CONTROLLING PRESSURE AND STATIC CHARGE BUILD UP WITHIN AN ANNULAR VOLUME OF A WELLLBORE

The present application is a continuation of U.S. application Ser. No. 11/593,608, "Controlling the Pressure and Static Charge Build Up Within an Annular Volume of a Wellbore," filed Nov. 7, 2006, which is now abandoned the contents of which are hereby incorporated by reference in their entirety. U.S. application Ser. No. 11/593,608 was filed as a Continuation-In-Part application of U.S. application Ser. No. 11/282,424, "Controlling the Pressure within an Annular Volume of a Wellbore," filed Nov. 18, 2005.

FIELD OF THE INVENTION

The present invention relates to a method for controlling the pressure generated by a fluid contained within a confined volume while the fluid within the volume is being heated. In a preferred embodiment, the present invention relates to a process for controlling the pressure within the annular volume described by a casing string assembly within a wellbore.

BACKGROUND OF THE INVENTION

During the process of drilling a wellbore, such as an oil well, individual lengths of relatively large diameter metal tubulars are typically secured together to form a casing string or liner that is positioned within each section of the wellbore. Each of the casing strings may be hung from a wellhead installation near the surface. Alternatively, some of the casing strings may be in the form of liner strings that extend from near the setting depth of a previous section of casing. In this case, the liner string will be suspended from the previous section of casing on a liner hanger. The casing strings are usually comprised of a number of joints or segments, each being on the order of forty feet long, connected to one another by threaded connections or other connection means. These connections are typically metal pipes, but may also be non-metal materials such as composite tubing. This casing string is used to increase the integrity of the wellbore by preventing the wall of the hole from caving in. In addition, the casing string prevents movement of fluids from one formation to another formation through which the wellbore passes.

Conventionally, each section of the casing string is cemented within the wellbore before the next section of the wellbore is drilled. Accordingly, each subsequent section of the wellbore must have a diameter that is less than the previous section. For example, a first section of the wellbore may receive a surface (or conductor) casing string having a 20-inch diameter. The next several sections of the wellbore may receive intermediate (or protection) casing strings having 16-inch, 13⅜-inch and 9⅝-inch diameters, respectively. The final sections of the wellbore may receive production casing strings having 7-inch and 4½-inch diameters, respectively. When the cementing operation is completed and the cement sets, there is a column of cement in the annulus described by the outside surface of each casing string.

Subterranean zones penetrated by well bores are commonly sealed by hydraulic cement compositions. In this application, pipe strings such as casings and liners are cemented in well bores using hydraulic cement compositions. In performing these primary cementing operations, a hydraulic cement composition is pumped into the annular space described by the walls of a well bore and the exterior surfaces of a pipe string disposed therein. The cement composition is permitted to set in the annular space to form an annular sheath of hardened substantially impermeable cement which supports and positions the pipe string in the well bore and seals the exterior surfaces of the pipe string to the walls of the well bore. Hydraulic cement compositions are also utilized in a variety of other cementing operations, such as sealing highly permeable zones or fractures in subterranean zones, plugging cracks or holes in pipe strings and the like.

Casing assemblies comprising more than one casing string describe one or more annular volumes between adjacent concentric casing strings within the wellbore. Normally, each annular volume is filled, at least to some extent, with the fluid which is present in the wellbore when the casing string is installed. In a deep well, the quantities of fluid within the annular volume (i.e., the annular fluid) may be significant. Each annulus 1 inch thick by 5000 feet long would contain roughly 50,000 gallons, depending on the diameter of the casing string.

In oil and gas wells it is not uncommon that a section of formation must be isolated from the rest of the well. This is typically achieved by bringing the top of the cement column from the subsequent string up inside the annulus above the previous casing shoe. While this isolates the formation, bringing the cement up inside the casing shoe effectively blocks the safety valve provided by nature's fracture gradient. Instead of leaking off at the shoe, any pressure build up will be exerted on the casing, unless it can be bled off at the surface. Most land wells and some offshore platform wells are equipped with wellheads that provide access to every casing annulus and an observed pressure increase can be quickly bled off. On the other hand, most subsea wellhead installations do not provide access to the casing annuli and a sealed annulus may be created. Because the annulus is sealed, the internal pressure can increase significantly in reaction to an increase in temperature.

The fluids in the annular volume during installation of the casing strings will generally be at or near the ambient temperature of the seafloor. When the annular fluid is heated, it expands and a substantial pressure increase may result. This condition is commonly present in all producing wells, but is most evident in deep water wells. Deep water wells are likely to be vulnerable to annular pressure build up because of the cold temperature of the displaced fluid, in contrast to elevated temperature of the production fluid during production. The temperature of the fluid in the annular volume when it is sealed will generally be the ambient temperature, which may be in the range of from 0° F. to 100° F. (for example 34° F.), with the lower temperatures occurring most frequently in subsea wells with a considerable depth of water above the well. During production from the reservoir, produced fluids pass through the production tubing at significantly higher temperatures. Temperatures in the range of 50° F. to 300° F. are expected, and temperatures in the range of 125° F. to 250° F. are frequently encountered.

The relatively high temperature of the produced fluids increases the temperature of the annular fluid between the casing strings, and increases the pressure against each of the casing strings. Conventional liquids which are used in the annular volume expand with temperature at constant pressure; in the constant volume of the annular space, the increased fluid temperature results in significant pressure increases. Aqueous fluids, which are substantially incompressible, could increase in volume by upwards of 5% during the temperature change from ambient conditions to production conditions at constant pressure. At constant volume, this increase in temperature may result in pressure increases up to on the order of 10,000 psig. The increased pressure significantly increases the chances that the casing string fails, with catastrophic consequences to the operation of the well.

What is needed is a method for replacing at least a portion of the conventional fluid within the annular volume with a fluid system which decreases in specific volume as temperature of the fluid is increased. Also needed are ways to control any build up of static charge within the fluid system in the annular volume to decrease the risk of sparking.

The annular pressure build up (APB) problem is well known in the petroleum drilling/recovery industry. See: B. Moe and P. Erpelding, "Annular pressure buildup: What it is and what to do about it," Deepwater Technology, p. 21-23, August (2000), and P. Oudeman and M. Kerem, "Transient behavior of annular pressure buildup in HP/HT wells," J. of Petroleum Technology, v. 18, no. 3, p. 58-67 (2005). Several potential solutions have been previously reported: A. injection of nitrogen-foamed cement spacers as described in R. F. Vargo, Jr., et. al., "Practical and Successful Prevention of Annular Pressure Buildup on the Marlin Project," Proceedings—SPE Annual Technical Conference and Exhibition, p. 1235-1244, (2002), B. vacuum insulated tubing as described in J. H. Azzola, et. al., "Application of Vacuum Insulated Tubing to Mitigate Annular Pressure Buildup," Proceedings—SPE Annual Technical Conference and Exhibition, p. 1899-1905 (2004), C. crushable foam spacer as described in C. P. Leach and A. J. Adams, "A New Method for the Relief of Annular Heat-up Pressure," in proceedings, —SPE Annual Technical Conference and Exhibition, p. 819-826, (1993), D. cement shortfall, full-height cementation, preferred leak path or bleed port, enhanced casing (stronger), and use of compressible fluids as described in R. Williamson et. al., "Control of Contained-Annulus Fluid Pressure Buildup," in proceedings, SPE/IADC Drilling Conference paper Number 79875 (2003), and E. use of a burst disk assembly, as described by J. Staudt in U.S. Pat. No. 6,457,528 (2002) and U.S. Pat. No. 6,675,898 (2004). These prior art examples, although potentially useful, do not provide full protection against the APB problem due to either difficulties in implementation or prohibitory costs, or both. Our invention is relatively easy to implement and cost effective.

SUMMARY OF THE INVENTION

As described herein, a process for controlling pressure within a confined volume and also controlling any build up of static charge is provided.

In one embodiment, the present invention relates to a process for controlling pressure and reducing build up of static charge within a confined volume, the process comprising:
a) providing a volume containing a first fluid having a first pressure and a first temperature within the volume;
b) replacing at least a portion of the first fluid within the volume with a second fluid comprising (i) at least one polymerizable monomer, and (ii) at least one antistatic agent;
c) sealing the volume to produce a confined volume; and
d) heating the fluid within the confined volume, such that the fluid is at a second pressure and at a second temperature, wherein the monomer polymerizes at a temperature between the first temperature and the second temperature and the monomer polymerizes with a decrease in pressure within the confined volume such that the second pressure is lower than had the confined volume contained the first fluid only at the second temperature.

The antistatic agent in the above described process preferably comprises hydrophilic and hydrophobic groups. The antistatic agent is preferably a neutral and/or ionic surfactant. In one embodiment, the antistatic agent is preferably an anionic phosphate ester. In other embodiments, the antistatic agent is selected from the group consisting of ZELEC TY™, ZELEC UN™, and mixtures thereof. In additional embodiments, the antistatic agent is a quaternary ammonium salt. Preferably, the antistatic agent is added in the above described process in an amount of from about 0.05 vol % to about 5 vol % of the total volume of the second fluid and more preferably in an amount of from about 0.1 vol % to about 1 vol % of the total volume of the second fluid.

In a separate embodiment, a process is provided for controlling pressure and reducing build up of static charge within the casing structure of a wellbore, wherein the pressure may vary from location to location within the wellbore. In this embodiment, the pressure and temperature relate to a single location within the annular volume. Thus, the process comprises:
a) providing an annular volume described by two casing strings within a wellbore and containing a first fluid having a first pressure and a first temperature at a selected location within the annular volume;
b) replacing at least a portion of the first fluid within the annular volume with a second fluid comprising (i) a monomer which polymerizes at a second pressure and at a temperature between the first temperature and a second temperature, and (ii) at least one antistatic agent;
c) sealing the annular volume to produce a confined volume;
d) heating the fluid within the confined volume, such that the fluid at the selected location is at the second pressure and at the second temperature;
wherein the second fluid is preselected such that the second pressure at the selected location is lower than the pressure at the selected location within the confined volume would have been had the confined volume contained the first fluid only at the second temperature.

In one embodiment, the second pressure, which occurs at a selected location within the annular volume at a second temperature, is equal to the first pressure at that location, in spite of an increased temperature of the fluid within the volume. In another embodiment, the second pressure at the selected location is no more than 50% higher, preferably no more than 30% higher and more preferably no more than 15% higher than the first pressure at the selected location.

In a separate embodiment, the process is directed to the maximum pressure within the annular volume and the reduction of the build up of static charge. For an annular volume with a substantial vertical length, the hydrostatic pressure generated by the annular fluid causes a pressure gradient through the vertical distance, with the pressure at the deepest location of the annular volume being greater than the pressure at the top of the wellbore, where locations relate to the earth's center. Thus, there is a location within the annular volume where the pressure is a maximum pressure. Therefore, in this embodiment, a process is provided for controlling the maximum pressure and reducing build up of static charge within the casing structure of a wellbore, the process comprising:
a) providing an annular volume described by two casing strings within a wellbore and containing a first fluid having a first maximum pressure at a first temperature within the annular volume;
b) replacing at least a portion of the first fluid within the annular volume with a second fluid comprising (i) a monomer which polymerizes at a temperature between the first temperature and a second temperature, and (ii) at least one antistatic agent;
c) sealing the annular volume to produce a confined volume;

d) heating the fluid within the confined volume to an elevated temperature relative to the first temperature, such that at least a portion of the fluid is at the second maximum pressure;

wherein the second fluid is preselected such that a second maximum pressure is lower than the maximum pressure within the confined volume would have been had the confined volume contained the first fluid only at the elevated temperature.

In one embodiment, the second maximum pressure within the annular volume is equal to the first maximum pressure. In this embodiment, there is no net pressure increase within the sealed annular volume, in spite of an elevated temperature of the fluid within the volume. In another embodiment, the second maximum pressure is no more than 50% higher, preferably no more than 30% higher and more preferably no more than 15% higher then the first maximum pressure.

In a further separate embodiment, a process is provided for controlling pressure and reducing build up of static charge within a confined volume, the process comprising:
a) providing at a first pressure and at a first temperature a volume containing a first fluid and a second fluid comprising (i) a monomer which polymerizes at a temperature between the first temperature and a second temperature, and (ii) at least one antistatic agent;
b) sealing the volume to produce a confined volume;
c) heating the first fluid and the second fluid within the confined volume, such that the first fluid and the second fluid are at a second pressure and at a second temperature;

wherein the second fluid is preselected such that the second pressure is lower than had the confined volume contained the first fluid only at the second temperature.

In a particular embodiment, the second fluid comprises a monomer at least one antistatic agent, wherein when the monomer polymerizes, with reduced volume, at a temperature and a pressure which is in accordance with the conditions within the sealed annular volume static charge build up is dissipated by the antistatic agent. Accordingly, a process is provided for controlling pressure and reducing build up of static charge within an annular volume within a wellbore comprising:
a) filling the annular volume with a first fluid;
b) replacing at least a portion of the first fluid with a second fluid comprising a polymerization system and at least one antistatic agent, within the annular volume; and
c) sealing the annular volume.

The antistatic agent in the above described process preferably comprises hydrophilic and hydrophobic groups, wherein the hydrophobic group of the antistatic agent is attracted towards the second fluid comprising the monomer and/or polymer, and wherein the hydrophilic group of the antistatic agent remains at the interface of the second fluid and the surrounding air such that the static charge is conductively dissipated thereby preventing arcing. In preferred embodiments, the antistatic agent is a neutral and/or ionic surfactant. Preferably, the antistatic agent is added in an amount of from about 0.05 vol % to about 5 vol % of the total volume of the second fluid and more preferably in an amount of from about 0.1 vol % to about 1 vol % of the total volume of the second fluid.

Among other factors, the present invention is based on the discovery of fluid systems which have unusual thermal expansion properties, in that the fluids expand, at constant pressure, to a lesser extent than would be expected for an incompressible fluid. The present invention is further based on the discovery of controlling static charge build up within these fluid systems through the addition of the antistatic agent, mentioned above, to the fluid system to decrease the risk of sparking and fire. Thus, when heated while being confined in a sealed volume, the fluids of the present invention cause a lower pressure increase within the sealed volume and exhibit more control over static charge build up, than would be expected for a conventional fluid.

DETAILED DESCRIPTION OF THE INVENTION

Definitions

In accordance with this detailed description, the following abbreviations and definitions apply. It must be noted that as used herein, the singular forms "a", "an", and "the" include plural referents unless the context clearly dictates otherwise. Thus, for example, reference to "compounds" includes a plurality of such.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

Unless otherwise stated, the following terms used in the specification and claims have the meanings given below:

"Halo" means fluoro, chloro, bromo, or iodo.

"Nitro" means the group —$NO_2$.

"Nitroso" means the group —NO.

"Hydroxy" means the group —OH.

"Carboxy" means the group —COOH.

"Lower alkyl" refers to monovalent alkyl groups having from 1 to 6 carbon atoms including straight and branched chain alkyl groups. This term is exemplified by groups such as methyl, ethyl, iso-propyl, n-propyl, n-butyl, iso-butyl, sec-butyl, t-butyl, n-pentyl and the like.

"Substituted lower alkyl" means an alkyl group with one or more substituents, preferably one to three substituents, wherein the substitutents are selected from the group consisting of amino, nitroso, nitro, halo, hydroxy, carboxy, acyloxy, acyl, aminoacyl, and aminocarbonyloxy. "Lower alkenyl" means a linear unsaturated monovalent hydrocarbon radical of two to six carbon atoms or a branched monovalent hydrocarbon radical of three to eight carbon atoms containing at least one double bond, (—C=C—). Examples of alkenyl groups include, but are not limited to, allyl, vinyl, 2-butenyl, and the like.

"Substituted lower alkenyl" means an alkenyl group with one or more substituents, preferably one to three substituents, wherein the substitutents are selected from the group consisting of amino, nitroso, nitro, halo, hydroxy, carboxy, acyloxy, acyl, aminoacyl, and aminocarbonyloxy.

The term "cycloalkyl" refers to cyclic alkyl groups of from 3 to 6 carbon atoms having a single cyclic ring including, by way of example, cyclopropyl, cyclobutyl, cyclopentyl and cyclohexyl.

"Alkoxy" refers to the group "lower alkyl-O—" which includes, by way of example, methoxy, ethoxy, n-propoxy, iso-propoxy, n-butoxy, tert-butoxy, sec-butoxy, n-pentoxy, 1,2-dimethylbutoxy, and the like.

"Amino" refers to the group $NR^aR^b$, wherein $R^a$ and $R^b$ are independently selected from hydrogen, lower alkyl, substituted lower alkyl, and cycloalkyl.

"Acyloxy" refers to the groups H—C(O)O—, lower alkyl-C(O)O—, substituted lower alkyl-C(O)O—, lower alkenyl-C(O)O—, substituted lower alkenyl-C(O)O— and cycloalkyl-C(O)O—, wherein lower alkyl, substituted lower alkyl, lower alkenyl, substituted lower alkenyl, and cycloalkyl are as defined herein.

"Acyl" refers to the groups H—C(O)—, lower alkyl-C(O)—, substituted lower alkyl-C(O)—, lower alkenyl-C(O)—, substituted lower alkenyl-C(O)—, cycloalkyl-C(O)—, wherein lower alkyl, substituted lower alkyl, lower alkenyl, substituted lower alkenyl, and cycloalkyl are as defined herein.

"Aminoacyl" refers to the groups —NRC(O) lower alkyl, —NRC(O) substituted lower alkyl, —NRC(O)cycloalkyl, —NRC(O) lower alkenyl, and —NRC(O) substituted lower alkenyl, wherein R is hydrogen or lower alkyl and wherein lower alkyl, substituted lower alkyl, lower alkenyl, substituted lower alkenyl, and cycloalkyl are as defined herein.

"Aminocarbonyloxy" refers to the groups —NRC(O)O-lower alkyl, —NRC(O)O-substituted lower alkyl, —NRC(O)O-lower alkenyl, —NRC(O)O-substituted lower alkenyl, —NRC(O)O-cycloalkyl, wherein R is hydrogen or lower alkyl and wherein lower alkyl, substituted lower alkyl, lower alkenyl, substituted lower alkenyl, and cycloalkyl are as defined herein.

"Aliphatic compounds" refer to non-aromatic organic compounds, in which carbon atoms are joined together in straight or branched chains rather than in benzene rings. One example of an aliphatic compound is methane. Aliphatic compounds include not only the fatty acids and other derivatives of paraffin hydrocarbons (e.g., alkanes), but also unsaturated compounds, such as ethylene (e.g., alkenes) and acetylene (e.g., alkynes).

"Antistatic agent" refers to any compound that reduces or dissipates the build up of static charge in the polymerizable monomers described herein. In preferred embodiments of the present invention, the antistatic agent has hydrophilic and hydrophobic groups. The hydrophobic group of the antistatic agent is attracted towards the second fluid comprising the monomer and/or polymer. The hydrophilic group of the antistatic agent remains at the interface of the second fluid and the surrounding air such that the static charge is conductively dissipated thereby preventing arcing. In preferred embodiments of the present invention, the antistatic agent is a surfactant.

"Fatty acids" refer to carboxylic acid derivatives having the general formula $C_nH_{2n+1}COOH$ including saturated or unsaturated aliphatic compounds with at least four carbon atoms, and preferably having at least eight carbon atoms.

"Neutral or ionic surfactants" refer to compounds that have hydrophilic and hydrophobic groups. The hydrophobic groups of the surfactants are attracted towards the second fluid comprising the monomer and/or polymer, and wherein the hydrophilic groups of the surfactants remain at the interface of the second fluid and the surrounding air such that the static charge is conductively dissipated thereby preventing arcing. In preferred embodiments, the surfactants can serve as antistatic agents in the various embodiments of the present invention.

"Salt" refers to salts derived from a variety of organic and inorganic counter ions well known in the art and include, by way of example only, sodium, potassium, calcium, magnesium, ammonium, tetraalkylammonium, and the like; and when the molecule contains a basic functionality, salts of organic or inorganic acids, such as hydrochloride, hydrobromide, tartrate, mesylate, acetate, maleate, oxalate and the like. Preferably, the salts are of inorganic acid salts, such as hydrochloride.

"Optional" or "optionally" means that the subsequently described event or circumstance may, but need not, occur, and that the description includes instances where the event or circumstance occurs and instances in which it does not. For example, "aryl group optionally mono- or di-substituted with an alkyl group" means that the alkyl may but need not be present, and the description includes situations where the aryl group is mono- or disubstituted with an alkyl group and situations where the aryl group is not substituted with the alkyl group.

The present invention provides a fluid system which, when heated within a confined volume, increases in pressure to a lower value than that of a conventional system and which has decreased risk of sparking and fire due to a decrease in the build up of static charge. The confined volume is sealed to prevent escape of the fluid. Accordingly, the present invention provides a fluid and a method for reducing the effect of a pressure increase within a sealed or confined volume when the fluid within the volume is heated to an elevated temperature.

In one embodiment, the volume may be any fluid-containing volume which is sealed and then heated. A non-limiting example of a volume of this invention is a reaction vessel, for performing, for example, chemical reactions. The volume, initially filled with the first fluid, is open, meaning that a fluid can be made to pass into and out of the volume. Prior to the volume being sealed, a second fluid is made to pass into the volume, replacing at least a portion of the first fluid in the volume. The volume is then sealed to prevent further flow of fluid into and out of the volume, and the fluid within the volume is heated. Such heating causes the pressure to increase to a substantial extent within the volume, particularly with liquid phase fluids, and more particularly with liquid phase fluids which are substantially incompressible. The invention, therefore, provides a second fluid having the property such that, when contained within the sealed volume and heated to a target temperature, the pressure within the volume is less than the pressure would be if the volume contained the first fluid only. Since the confined volume and the second fluid may build up static charge, the second fluid further comprises an antistatic agent to reduce the build up of static charge and to reduce the risk of sparking and fire.

In a particular embodiment, the invention provides a process for controlling pressures within a wellbore, and particularly within an annular volume within a casing assembly which has been installed in a wellbore, intended, for example, for removing a resource from a reservoir. Examples of resources include crude oil, natural gas liquids, petroleum vapors (e.g., natural gas), synthesis gas (e.g., carbon monoxide), other gases (e.g., carbon dioxide, nitrogen), and water or aqueous solutions. The control of pressure is accomplished using a second fluid as described herein. These embodiments are particularly susceptible to sparking and fires. Accordingly, it has been surprisingly discovered that the addition of an antistatic agent to the second fluid allows for decreased risk of sparking and fires.

A casing assembly comprises casing strings for protecting the sides of the wellbore which is formed by drilling into the earth. The annular volume is bounded by two adjacent concentric casing strings within the casing assembly. During construction of oil and gas wells, a rotary drill is typically used to bore through subterranean formations of the earth to form the wellbore. As the rotary drill bores through the earth, a drilling fluid, known in the industry as a "mud," is circulated through the wellbore. The mud is usually pumped from the surface through the interior of the drill pipe. By continuously pumping the drilling fluid through the drill pipe, the drilling fluid can be circulated out the bottom of the drill pipe and back up to the well surface through the annular space between the wall of the wellbore and the drill pipe. The mud is usually returned to the surface when certain geological information is desired and when the mud is to be recirculated. The mud is used to help lubricate and cool the drill bit and facilitates the removal of cuttings as the wellbore is drilled. Also, the hydrostatic pressure created by the column of mud in the hole prevents blowouts which would otherwise occur due to the high pressures encountered within the wellbore. To prevent a blowout caused by the high pressure, heavy weight is put into the mud so the mud has a hydrostatic pressure greater than any pressure anticipated in the drilling.

Different types of mud must be used at different depths because pressure increases in the wellbore with increasing depth of the wellbore. For example, the pressure at 2,500 ft. is much higher than the pressure at 1,000 ft. The mud used at 1,000 ft. would not be heavy enough to use at a depth of 2,500 ft. or a blowout may occur. The weight of the mud at the extreme depths in subsea wells must be particularly heavy to counteract the high pressure. However, the hydrostatic pressure of this particularly heavy mud may cause the mud to start encroaching or leaking into the formation, creating a loss of circulation of the mud. Casing strings are used to line the wellbore to prevent leakage of the drilling mud.

To enable the use of different types of mud, different strings of casing are employed to eliminate the wide pressure gradient found in the wellbore. To start, the wellbore is drilled using a light mud to a depth where a heavier mud is required. This generally occurs at a little over 1,000 ft. At this stage, a casing string is inserted into the wellbore. A cement slurry is pumped into the casing and a plug of fluid, such as drilling mud or water, is pumped behind the cement slurry in order to force the cement up into the annulus between the exterior of the casing and the interior of the wellbore. The amount of water used in forming the cement slurry will vary over a wide range depending upon the type of hydraulic cement selected, the required consistency of the slurry, the strength requirement for a particular job, and the general job conditions at hand.

Typically, hydraulic cements, particularly Portland cements, are used to cement the well casing within the wellbore. Hydraulic cements are cements which set and develop compressive strength due to the occurrence of a hydration reaction which allows them to set or cure under water. The cement slurry is allowed to set and harden to hold the casing in place. The cement also provides zonal isolation of the subsurface formations and helps to prevent sloughing or erosion of the wellbore.

After the first casing is set, the drilling continues until the wellbore is again drilled to a depth where a heavier mud is required and the required heavier mud would start encroaching and leaking into the formation, generally at around 2,500 feet. Again, a casing string is inserted into the wellbore inside the previously installed string, and a cement slurry is added as before.

Multiple casing strings may also be used in the wellbore to isolate two or more formations which should not communicate with one another. For example, a unique feature found in the Gulf of Mexico is a high pressure fresh water sand that flows at a depth of about 2,000 feet. Due to the high pressure, an extra casing string is generally required at that level. Otherwise, the sand would leak into the mud or production fluid.

A subsea wellhead typically has an outer housing secured to the sea floor and an inner wellhead housing received within the outer wellhead housing. During the completion of an offshore well, the casing and tubing hangers are lowered into supported positions within the wellhead housing through a BOP stack installed above the housing. Following completion of the well, the BOP stack is replaced by a Christmas tree having suitable valves for controlling the production of well fluids. The casing hanger is sealed off with respect to the housing bore and the tubing hanger is sealed off with respect to the casing hanger or the housing bore, so as to effectively form a fluid barrier in the annulus between the casing and tubing strings and the bore of the housing above the tubing hanger. After the casing hanger is positioned and sealed off, a casing annulus seal is installed for pressure control. If the seal is on a surface well head, often the seal can have a port that communicates with the casing annulus. However, in a subsea wellhead housing, there is a large diameter low pressure housing and a smaller diameter high pressure housing. Because of the high pressure, the high pressure housing must be free of any ports for safety. Once the high pressure housing is sealed off, there is no way to have a hole below the casing hanger for blowout prevention purposes.

Figure 1:
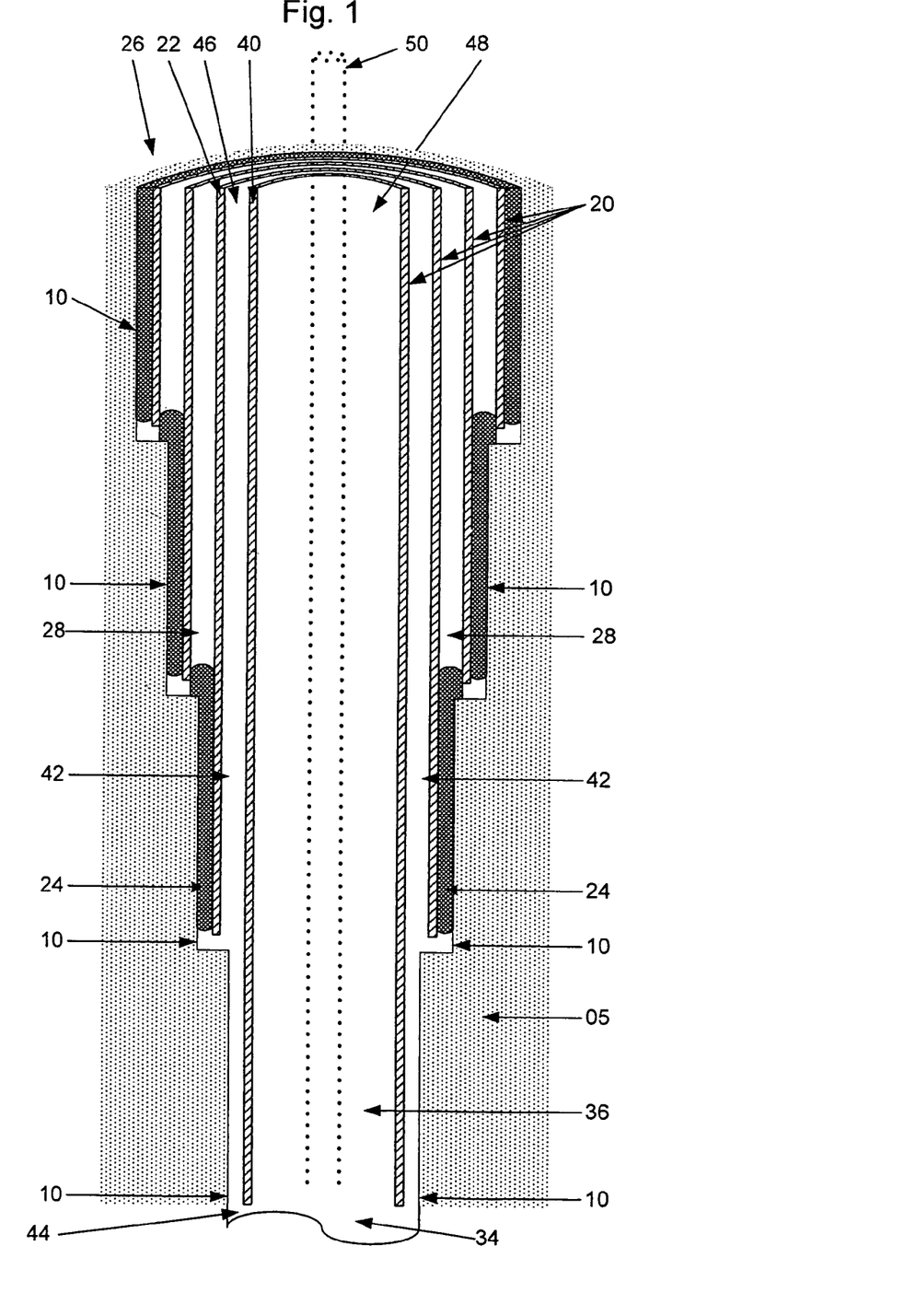
FIG. 1 illustrates an embodiment of the process of the invention, showing an open annular volume, during which time a second fluid is being added to the annular volume.

Representatively illustrated in FIG. 1 is a method which embodies principles of the present invention. In the following description of the method and other apparatus and methods described herein, directional terms, such as "above", "below", "upper", "lower", etc., are used only for convenience in referring to the accompanying drawings. Additionally, it is to be understood that the various embodiments of the present invention described herein may be utilized in various orientations, such as inclined, inverted, horizontal, vertical, etc., and in various configurations, without departing from the principles of the present invention. The process described herein is applicable to wellbores in landed sites and in underwater sites. It should be understood that the wellbore terminates at one end where the wellbore enters the earth. In the case of underwater sites, the terminus is at the water/earth interface.

It should be understood that use of the terms "wellbore" and "casing string" herein are not to be taken as limiting the invention to the particular illustrated elements of the methods. The wellbore could be any wellbore, such as a branch of another wellbore, and does not necessarily extend directly to the earth's surface. The casing string could be any type of tubular string, such as a liner string, etc. The terms "casing string" and "liner string" are used herein to indicate tubular strings of any type, such as segmented or un-segmented tubular strings, tubular strings made of any materials, including nonmetal materials, etc. Thus, the reader will appreciate that these and other descriptive terms used herein are merely for convenience in clearly explaining the illustrated embodiments of the invention, and are not used for limiting the scope of the invention.

FIG. 1 illustrates an embodiment of the invention. A wellbore 10 has already been drilled using drill string 50, and a casing assembly 20, comprising at least two casing strings in a concentric arrangement with respect to each other, has been previously installed. The drill rig, with supporting means for supporting the drill string, for installing the casing strings, and for supplying the fluids to the wellbore, is not shown. In FIG. 1, casing string 22 has been installed, and is sealed at or near one end against the wellbore 10 by a cement plug 24.

Particular attention is now directed to casing string 40, which has been installed to extend to wellbore terminus 34. It is clear that terminus 34 may be a temporary terminus, such that the wellbore may be extended further after casing string 40 has been installed. Alternatively, casing string 40 may extend to the ultimate depth in formation 5, and the wellbore will not be extended before production commences. An annular volume 42, described by the inside surface of casing string 22 and the outside surface of casing string 40, is filled with a fluid, and generally filled with the fluid which is present within the wellbore volume 36 when casing string 40 is installed. Conventional fluids which may initially be present in the annular volume include a drilling fluid or a completion fluid, depending on the circumstances of the drilling operation. The properties of the fluid initially within the annular volume, herein termed the first fluid, is selected to meet the needs of the wellbore drilling practitioner for drilling to complete the well. In an embodiment, the first fluid is an incompressible fluid, using the conventional definition.

The composition of the first fluid is not critical for the invention, and will generally be one of various fluids used in drilling and completing the well, including, for example, a drilling fluid or a completion fluid. Drilling fluids may be water or oil based, and may further comprise surfactants, salts, weighting agents and any other materials which are needed for effective cooling of the drill bit, removal of cuttings, and protection and conditioning of the wellbore for fluid production. Likewise, completion fluids may be water or oil based, and may further comprise materials for cleaning the wellbore and installed structures in preparation for recovery of fluids from the formation.

At the stage in the process illustrated in FIG. 1, the annular volume 42 is in fluid communication with the wellbore volume 36 via the opening 44 at one end of the casing. The other end of the annular volume, designated by 46, is in fluid communication with surface equipment, such as a drilling rig, (not shown), which has the means for recovering a fluid leaving the annular volume through 46. Environmental concerns provide the incentive for minimizing the amount of fluid lost to the environment through 46.

In the process of the invention, a second fluid comprising at least one polymerizable monomer and at least one antistatic agent is introduced into the wellbore volume 36 through opening 48 to replace at least a portion of the first fluid in the annular volume 42. Opening 48 is in fluid communication with means for supplying the second fluid. Pumping means for this purpose may be located, for example, on a drilling rig or a production rig. The second fluid is supplied to the volume as a plug or pill, and passes downward through the wellbore volume 36 in relatively pure form. At the wellbore terminus 34, the second fluid enters the annular volume 42 through opening 44, and passes upward, driving the first fluid originally in the annular volume 42 ahead of the second fluid pill, and out of the annular volume through opening 46. The amount of the second fluid which is supplied to the annular volume is a matter of engineering choice, depending on the amount of pressure which can be tolerated inside the sealed annular volume 42. This amount is further influenced by, for example, the size of the well system, the temperature of the second fluid when it is supplied to the annular volume, the temperature of the fluids which will be produced in the well, expected temperature of the fluid in the annular volume during production, design and specifications of the casing string and the like.

Figure 2:
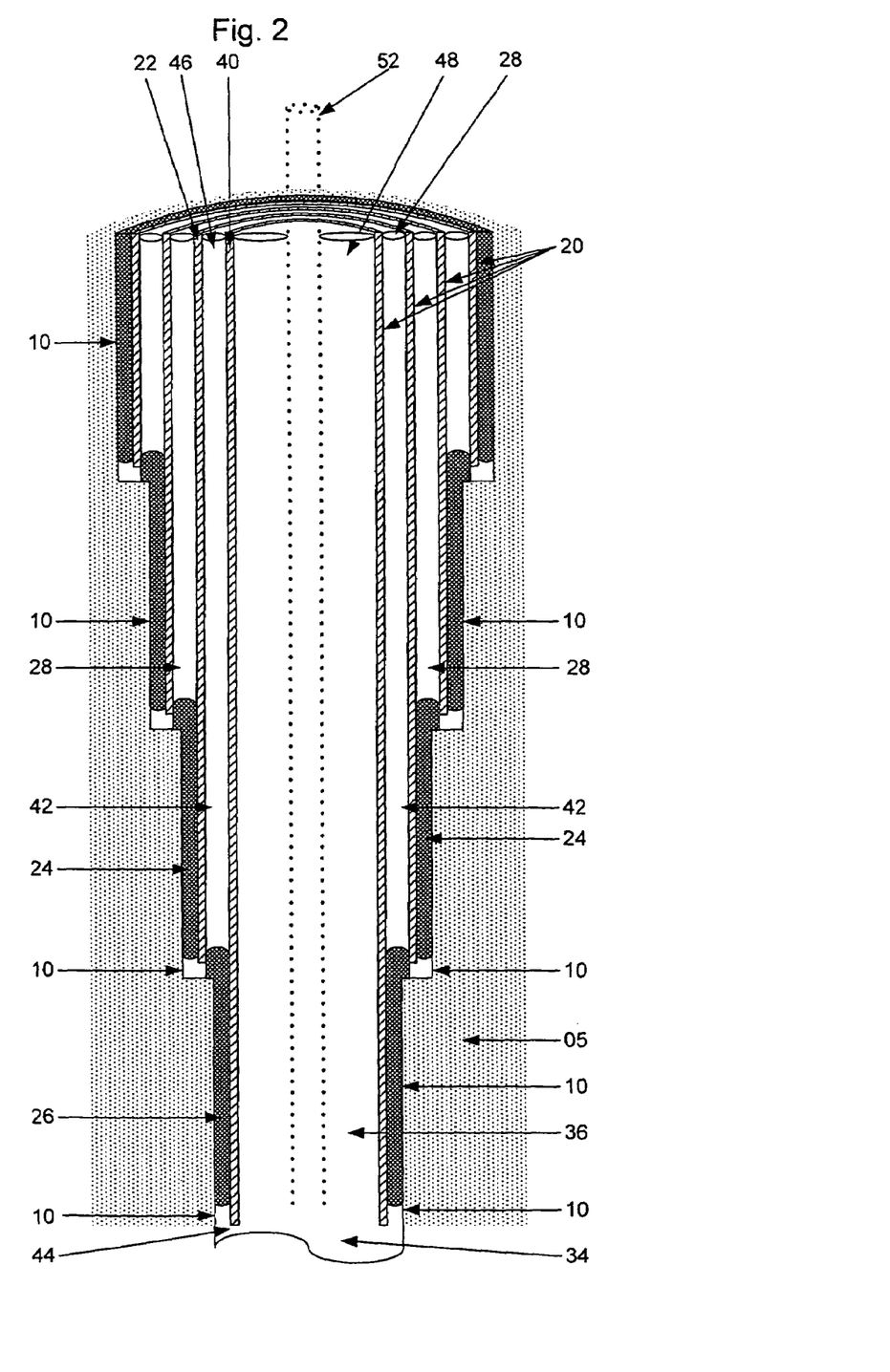
FIG. 2 illustrates an embodiment of the process of the invention, showing a sealed annular volume containing a second fluid at a second temperature and at a second pressure, as disclosed herein.

After a sufficient amount of the second fluid has been added to annular volume 42 to replace at least a portion of the first fluid contained therein, the annular volume 42 is sealed. FIG. 2 illustrates the annular volume 42 sealed by a concrete plug at 26, and by the casing annulus plug, shown at 28. Generally, the casing annulus seal seals the top of the wellbore, preventing escape of fluids from the wellbore into the environment. Thus, the sealed, or confined, volume represented by the annular volume 42 of the casing strings contains a fluid, which is confined in place and prevented from leaking from the volume to any noticeable extent.

In the embodiment illustrated in FIG. 2, at least a portion of a first fluid contained within a volume such as an annular volume 42, and having a first pressure and a first temperature within the volume, is replaced with a second fluid comprising at least one polymerizable monomer and at least one antistatic agent, such that the volume is filled with the combination of the first fluid and the second fluid. The annular volume 42, between the casing strings 22 and 40, is sealed by concrete plug 26 and by casing annulus plug 28. The temperature of the fluid within the annular volume 42, comprising the second fluid, is generally within the range of 0°-100° F. For subsea installations, the fluid temperature (i.e., the first temperature) is often less than 60° F., or less than 40° F., or, for example, in the temperature range between 25° F. and 35° F.

When hydrocarbon fluids begin to be produced and to flow up through production conduit 52 and out of the wellbore 10, these fluids are generally at a higher temperature than the first temperature. Production fluid temperatures in the range of 50° F. to 300° F. are expected, and temperatures in the range of 125° F. to 250° F. are frequently encountered. The relatively hotter production fluids within conduit 52 heat the fluid within the confined annular volume 42, such that the fluid is at a second pressure and at a second temperature. In conventional systems, the fluid pressure within the sealed annular volume would begin to increase to a significantly higher pressure as the temperature increases.

In contrast, according to the present invention, the second fluid comprising at least one polymerizable monomer is preselected such that the second pressure within the confined volume, after the temperature of the fluid within the volume is increased to the second temperature, is lower than had the confined volume contained the first fluid only at the second temperature. As such, after the temperature of the fluid within the volume is increased to the second temperature, the polymerizable monomer in the second fluid polymerizes with a decrease in pressure within the confined volume such that the second pressure is lower than if had the confined volume contained only the first fluid at the second temperature. The second fluid also comprises at least one antistatic agent which reduces static charge build up.

In preferred embodiments of the present invention, the antistatic agent has hydrophilic and hydrophobic groups. The hydrophobic group of the antistatic agent is attracted towards the second fluid comprising monomer and/or polymer. The hydrophilic group of the antistatic agent remains at the interface of the second fluid and the surrounding air such that the static charge is conductively dissipated thereby preventing arcing. In preferred embodiments, the antistatic agent is a surfactant.

Examples of antistatic agents having a hydrophilic group and a hydrophobic group include, but are not limited to, anionic phosphate esters and quaternary ammonium salts selected from the group consisting of dioctadecyldimethylammonium chloride, ditallow dimethyl ammonium chloride, dicetyldimethyl-ammonium chloride, bis-docosyldimethylammonium chloride, didodecyldimethylammonium chloride, ditallowdimethylammonium bromide, dioleoyldimethylammonium hydroxide, ditallowdiethyl-ammonium chloride, ditallowdipropylammonium bromide, ditallowdibutylammonium fluoride, cetyldecylmethylethylammonium chloride, bis-[ditallowdimethylammonium]sulfate, tris-[ditallow-dimethylammonium]phosphate, and mixtures thereof.

The anionic phosphate esters are preferably selected from the group consisting of ZELEC TY™ and/or ZELEC UN™ (both are available from DuPont, Wilmington, Del.).

As a result of the reduction of the build up of static charge in the second fluid, it is possible to substantially reduce the risk of risks associated with sparking and fire.

The benefits and advantages derived from practice of the invention are contrasted with the deficiencies of the conventional process. The annular volume is initially filled with a first fluid. The temperature of the first fluid may be at ambient temperature or below, depending on the condition of the wellbore during addition of the first fluid. For subsea wellbores, the first fluid may be cooled by the water through which the first fluid passes enroute from the source at the drilling platform to the wellbore. Under these conditions, the first fluid will generally be at a temperature in the range of 0° F. to 100° F. For subsea installations, the fluid temperature (i.e., the first temperature) is often less than 60° F., or less than 40° F., or, for example, in the temperature range between 25° F. and 35° F. After the fluid is sealed within the annular volume, it is heated by the production fluids passing upward through the production tubing 52 in the wellbore; the increased temperature conventionally results in an increase in pressure, sometimes up to catastrophic levels. Moreover, there may be a risk of sparking and fire due to a build up of static charge in the confined volume which can result in disastrous damages.

Annular Pressure

In contrast, according to the present invention, this pressure within the annular volume is controlled to manageable levels by the process disclosed herein. In the practice of the invention, a confined volume which contains a fluid is heated, such that the fluid within the confined volume is at a second pressure and at a second temperature. In one embodiment, the second pressure is uniform throughout the confined volume. In another embodiment, the second pressure may vary from place to place within the volume. In this embodiment, therefore, the second pressure (and second temperature) is referenced to a particular location, termed the selected location, within the annular volume. For example, the annular volume within the casing assembly in a wellbore can have a vertical extent of hundreds, and even thousands, of feet. The hydrostatic pressure within the fluid-filled wellbore is thus expected to be higher at the bottom of the wellbore than at its top. In another embodiment, therefore, the present process is directed to controlling the maximum pressure within the annular volume, taking account of the hydrostatic head and other factors within the volume.

For purposes of this disclosure, the target pressure is the desired pressure within the annular volume during the practice of the present invention. In one embodiment, the target pressure in the practice of the invention is a second pressure which is lower than had the confined volume contained the first fluid only. In another embodiment, the second pressure is equal to the first pressure within the annular volume. In another embodiment, the second fluid comprising at least one polymerizable monomer is preselected such that static charge build up is reduced and the second pressure of the second fluid contained within the sealed annular volume at the second temperature is no more than 50% higher, preferably no more than 30% higher, and more preferably no more than 15% higher than the first pressure of the unsealed annular volume at a first temperature and containing the first fluid only.

In many cases, the first pressure, the first temperature, the second pressure and the second temperature may be measured and the quantitative value of each may be known. It will be recognized by the skilled practitioner, however, that the invention may be practiced in its entirety without knowledge of the quantitative values of these parameters. It is sufficient for the practice of the invention that the second pressure be maintained below the pressure limit at which the integrity of the container (e.g., the casing string) in which the fluid is contained will be compromised to an unacceptable extent.

Second Fluid System

In the practice of the invention, the first fluid within the annular volume is replaced, at least in part, by a second fluid. As used herein, the fluid which is added to the annular volume to control the pressure within the annular volume is termed the second fluid or, in the alternative, the annular fluid.

In general, the second fluid comprises a liquid component and an additional component which contributes to the desired properties as described herein. According to the present invention, the additional component includes at least one polymerizable monomer and at least one antistatic agent. The liquid component may comprise water, hydrocarbons or both, including, for example, one or more components of a drilling fluid. Aqueous solutions containing dissolved organic and/or inorganic salts, acids or bases may be included in the second fluid system. Hydrocarbon mixtures, including materials typically found in drilling fluids or completion fluids may be included. Examples include diesel fuel, $C_6$ to $C_{20}$ mixtures, alcohols, aldehydes, ketones, ethers, carbonyls, aromatics, paraffins and cycloparaffins. Emulsions with a continuous aqueous phase and a discontinuous organic phase may be included; alternatively, emulsions with a continuous organic phase and a discontinuous aqueous phase may be included.

Further, the second fluid may include a liquid phase as the continuous phase, and further include solids, which may be present as a slurry or as massive particles. Or, the second fluid may comprise a liquid as a continuous phase, either layered with a vapor phase, or containing a vapor phase in the form of bubbles within the liquid. In another embodiment, the second fluid comprises liquid, vapor and solid phases, in any or all of the forms described above. In each alternative, the second fluid has unexpected expansion properties with respect to an increase in temperature of the fluid.

A build up of static charge may occur within the confined volume. Moreover, replacing a portion of the first fluid within the annular volume with the second fluid may result in additional second fluid build up of static charge. This build up of static charge leads to an increased risk of sparking and fire, which would have catastrophic consequences.

According to the present invention, the second fluid comprises at least one polymerizable monomer and at least one antistatic agent. The second fluid has thermal expansion properties which cause a lower pressure increase within the annular volume than would be expected for a substantially incompressible liquid. The second fluid also has reduction of static charge build up properties because the second fluid comprises at least one antistatic agent. In preferred embodiments of the present invention, the antistatic agent has hydrophilic and hydrophobic groups. The hydrophobic group of the antistatic agent is attracted towards the second fluid comprising the monomer and/or polymer. The hydrophilic group of the antistatic agent remains at the interface of the second fluid and the surrounding air such that the static charge is conductively dissipated thereby preventing arcing. In preferred embodiments, the antistatic agent is a surfactant.

The addition of the at least one antistatic agent to the second fluid reduces risks associated with the build up of static charge.

Polymerizable Monomer

According to the present invention, the second fluid comprises at least one polymerizable monomer. As such, according to the present invention, a process is provided for controlling the pressure within a confined volume by providing a second fluid comprising a monomer which polymerizes with a reduction in specific volume at the second pressure and at a temperature in the range of between the first temperature to the second temperature. Accordingly, the pressure within the sealed annular volume is decreased on heating by the polymerization of a monomer which is added to the annular fluid prior to sealing the volume. Both a water soluble monomer and a water insoluble monomer, when added to the annular volume, can polymerize, with an accompanying decrease in volume (and associated decrease in pressure within the annular volume). Such a decrease in volume would, in the confined volume of the sealed annulus, result in a decrease in pressure, within the confined volume, relative to a similar system without polymerization of the particular monomers of the present invention.

The monomer of the invention may be mixed with water, with oil, or with a more complex mixture characteristic of a drilling mud, including high density components in the preparation of the second fluid. The monomer will be present in the second fluid in the range of 1 to 99 vol %, more preferably in the range of 5 to 75 vol %, still more preferably in the range of 10 to 50 vol %. An example second fluid comprises 20 vol % of the monomer and 80 vol % of a second component comprising water and a high density material such as barium sulfate.

With polymerization of monomers, including polymerization of acrylates, such as methyl acrylate and methyl methacrylate, as much as a 25% reduction in volume between the liquid monomer and solid polymer can result from the polymerization process. See, for example, "Acrylic and Methacrylic Ester Polymers", in *Encyclopedia of Polymer Science and Engineering,* 2nd Edition, J. Kroschwitz, ed., John Wiley & Sons, Inc., Volume 1, Table 20, p. 266, (1985), and D. A. Tildbrook, at. al, "Prediction of Polymerization Shrinkage Using Molecular Modeling," J. Poly. Sci; Part B: Polymer Physics, 41, 528-548 (2003). In a preferred embodiment of this invention, the monomer is suspended or emulsified (using soap) in water as a water/oil mixture with appropriate polymerization initiator(s), pumped into the annular space, and after cementation, polymerization occurs (again, taking advantage of slow kinetics at the nearly freezing temperature), with a total volume decrease of up to 5% can be achieved with a 20% vol/vol mixture of monomer and water.

Non-limiting examples of acrylic monomers include acrylamide, methacrylamide, their derivatives, acrylic acid, methacrylic acid, their salts, acid salts and quaternary salts of N,N-dialkylaminoalkyl acrylates or methacrylates, acidic salts of diallylamine, diallyldialkyl ammonium salts, sulfoalkyl acrylates or methacrylates, acrylamidealkyl sulfonic acids and their salts, and the like. More preferably, the acrylic monomers include methyl acrylate, methyl methacrylate, and mixtures thereof. Non-limiting examples of other vinyl monomers that could be practical for this in-situ polymerization process include other acrylic esters, methacrylic esters, butadiene, styrene, vinyl chloride, N-vinylpyrrolidone, N-vinylcaprolactam, or other such oil and/or water soluble monomers.

Additional benefits can be derived from the choice of initiator for the polymerization process. An azo-type initiator produces nitrogen gas as a by-product during the polymerization process. The resulting gas phase component which is generated in the confined annular volume, being a compressible fluid, can contribute to the control of the pressure within the confined annular volume as the annular fluid is being heated by the product fluid passing through the production tubing. A peroxide initiator may also be used, depending on the temperature and chemical constraints of the product fluid. Alternatively, a redox initiator system such as ammonium persulfate and the activator N,N,N'N'-tetramethylethylenediamine, or potassium persulfate and the activator ferrous sulfate/sodium bisulfite could also be used if encapsulated as mentioned above to control the timing of when the polymerization occurs.

The second fluid also comprises at least one antistatic agent which reduces static charge build up.

Antistatic Agents

The confined volume upon sealing can build up static charge. Moreover, during handling of the monomer and during polymerization of the monomer, static charges can build up. A build up of static charge increases the danger of sparking and increases the risk of fires and explosions. Static charge build up can be controlled by increasing the electrical conductivity of the second fluid comprising the polymerized monomer. The increase in electrical conductivity can be accomplished by increasing ionic or electronic conductivity. Static charge build up can also be controlled by increasing electrical conductivity through moisture adsorption. Moisture adsorption can be achieved by use of hygroscopic antistatic agents, which are generally referred to as humectants since they rely on the adsorption of atmospheric moisture for their effectiveness. Antistatic agents can further operate by dissipating static charge as it builds up; thus, static decay rate and surface conductivity are common measures of the effectiveness of antistatic agents. According to the present invention, antistatic agents that operate to dissipate static charge are added to the polymerization system.

According to the present invention, antistatic agents refer to compounds that reduce or dissipate the build up of static charge in the second fluid. As such, according to the present invention, antistatic agents are added to the second fluid comprising the polymerizable monomer.

Examples of antistatic agents include amines and amides, esters of fatty acids, organic acids, polyoxyethylene derivatives, polyhydridic alcohols, neutral or ionic surfactants, quaternary ammonium salts, and mixtures thereof. Other examples of antistatic agents include combinations of fatty acid salts and tertiary amines, fatty amide condensates, hydroxyalkyl fatty acid amides, quaternary alkyl ammonium compounds, alkyl propylamines, ethoxylated amines, and mixtures thereof. Still further examples of antistatic agents include (i) N-(2-hydroxyalkyl)ethanolamine; (ii) a combination of N,N-bis(2-hydroxyethyl)higher aliphatic amine and a higher aliphatic alcohol; (iii) a combination of N-(2-hydroxy-3-dodecyloxypropyl)ethanolamine and N,N-bis(2-hydroxyethyl)alkylamine; (iv) tetrahydropyrimidine; and (v) mixtures thereof. Other exemplary antistatic agents can be selected from the group consisting of glycerol monostearate, sodium stearyl sulfonate, sodium dodecylbenzenesulfonate, triethanolamine stearate, and mixtures thereof.

Additional examples of the antistatic agents include (i) N-acyl derivatives of N-methyl glycine, wherein the acyl group is lauroyl, oleoyl or derived from combined fatty acids of coconut oil; (ii) N-acyl sarcosinates and their salts; (iii) N,N-bis(2-hydroxyethyl)higher aliphatic amine; and (iv) mixtures thereof, each of which are described in U.S. Pat. No. 4,785,032. The N-acyl sarcosinates can be prepared by a variety of methods including those described in U.S. Pat. No. 2,063,987 and U.S. Pat. Nos. 2,729,657, 3,074,980 and 3,836,551.

In preferred embodiments of the present invention, the antistatic agent has hydrophilic and hydrophobic groups. The hydrophobic group of the antistatic agent is attracted towards the second fluid comprising the monomer and/or polymer. The hydrophilic group of the antistatic agent remains at the interface of the second fluid and the surrounding air such that the static charge is conductively dissipated thereby preventing arcing. In preferred embodiments, the antistatic agent is a surfactant.

Preferred examples of antistatic agents having a hydrophilic group and a hydrophobic group include, but are not limited to, anionic phosphate esters and quaternary ammonium salts selected from the group consisting of dioctadecyldimethylammonium chloride, ditallow dimethyl ammonium chloride, dicetyldimethyl-ammonium chloride, bis-docosyldimethylammonium chloride, didodecyldimethylammonium chloride, ditallowdimethylammonium bromide, dioleoyldimethylammonium hydroxide, ditallowdiethyl-ammonium chloride, ditallowdipropylammonium bromide, ditallow-dibutylammonium fluoride, cetyldecylmethylethylammonium chloride, bis-[ditallowdimethylammonium]sulfate, tris-[ditallow-dimethylammonium]phosphate, and mixtures thereof.

The anionic phosphate esters are preferably selected from the group consisting of ZELEC TY™ and/or ZELEC UN™ (both are available from DuPont, Wilmington, Del.). ZELEC UN™ is an anionic phosphate ester which is an unneutralized phosphate ester and is insoluble in water. Further, ZELEC UN™ has a high molecular weight with a $C_8$ to $C_{16}$ fatty alcohol backbone. Accordingly, ZELEC UN™ is an unneutralized water-insoluble, anionic phosphate $C_8$ to $C_{16}$ alkyl ester of phosphoric acid and a fatty alcohol. ZELEC TY™ is a neutralized, water-soluble anionic phosphate ester with a lower molecular weight fatty alcohol backbone.

In a preferred embodiment, at least one antistatic agent is added to the second fluid in an amount of from about 0.01 vol % to about 10 vol %, more preferably the at least one antistatic agent is added to the second fluid in an amount of from about 0.05 vol % to about 5 vol %, and most preferably the at least one antistatic agent is added to the second fluid in an amount of from about 0.1 vol % to about 1 vol %.

EXAMPLES

Laboratory experiments demonstrated an effective reduction in volume of a mixture of methyl methacrylate in an emulsion polymerization process, and by example below, the process was proven to work in an apparatus which holds volume constant, while monitoring pressure during a heating cycle (Example 1), and in a field experiment using a 500 foot test well (Example 2). A field experiment using a second fluid comprising methyl methacrylate and an antistatic agent is conducted using a 500 foot well test (Example 3).

Example 1

Figure 3:
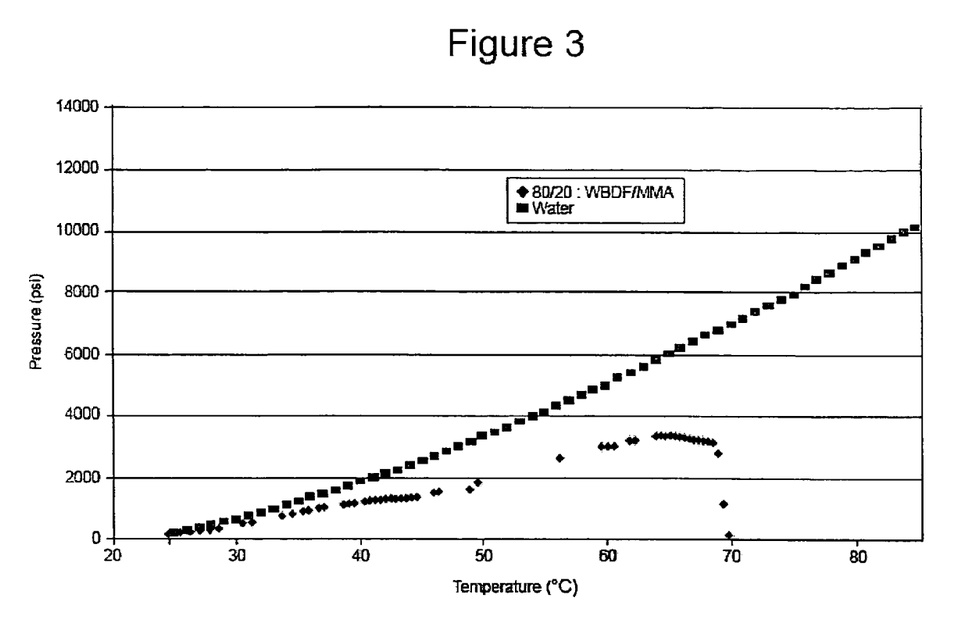
FIG. 3 illustrates an experimental result from testing one embodiment of the invention.

A pressure bomb was filled with an aqueous fluid at 200 psig starting pressure. The bomb was then sealed to prevent escape of fluids from the bomb, and heated from 24° C. to 100° C. As shown in FIG. 3, the pressure of the fluid within the bomb increased to 14,000 psig during the heating cycle.

The pressure bomb used above was filled with an aqueous emulsion fluid containing a 20% volume loading of methyl methacrylate (with azo-type intitiator) at 200 psig starting pressure. The bomb was then sealed to prevent escape of fluids from the bomb, and heated from 24° C. to 100° C. As shown in FIG. 3, the pressure of the fluid within the bomb increased to approximately 3000 psig, but at a lower rate of increase than with the aqueous fluid alone. At approximately 70° C., polymerization of the methyl methacrylate monomer was initiated, and the pressure within the bomb decreased to below the initial pressure within the bomb.

Example 2

Figure 4:
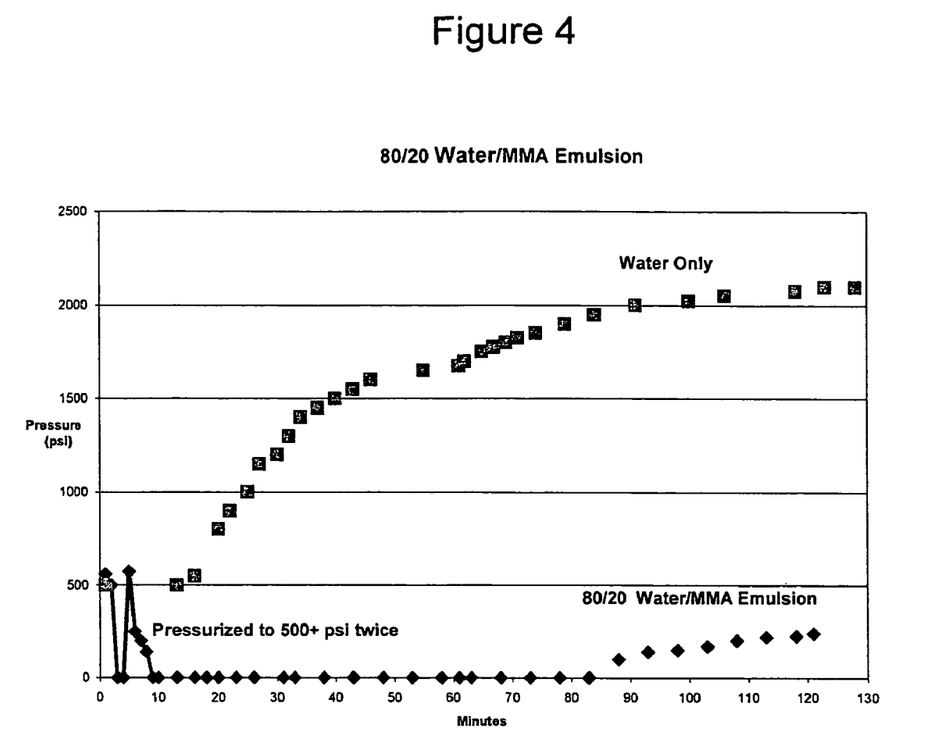
FIG. 4 illustrates an experimental result from testing one embodiment of the invention.

A scaled up field experiment was also performed. Water was used in a 500 foot deep test well within an annular space confined by 7 inch and 9⅝ inch casings. After placement of the fluid, the annular space was pre-pressurized to 500 psig, and then heated by circulating hot water inside the 7 inch pipe. Over a period of 2 hours, the temperature input was 190 F, and a temperature out of 160 F (due to the down-hole formation absorbing heat). The resulting pressure was about 2100 psig (FIG. 4).

A similar emulsion fluid as described in Example 1, containing 20% volume loading of methyl methacrylate (with azo-type initiator) was used in the same test well. Within several minutes after the initial 500 pre-pressurization, it was noted that the pressure had already dropped to zero, so the annulus was again pressurized up to 500 psig. Over a period of 2 hours, the temperature was elevated as before, and it was noted that the input and output temperatures were virtually identical due to the heat generated by the polymerization reaction. The pressure again decreased to zero, and then slowly increased to a final stable pressure of 240 psig (FIG. 4). The significant drop in pressure was due to the shrinkage of the monomer to polymer. Samples collected at the end of the experiment were analyzed for monomer and polymer. There was evidence of a trace amount of monomer (<1%), and the polymer had a weight-average molecular weight of nearly 3 million.

Example 3

A scaled up field experiment is performed using a similar emulsion fluid as described in Example 1 but also containing an antistatic agent. The emulsion fluid contains 20% volume loading of methyl methacrylate (with azo-type initiator) and 1% volume loading of Dupont ZELEC TY™ or ZELEC UN™ (Dupont, Wilmington, Del.). The emulsion fluid is used in a 500 foot deep test well within an annular space confined by 7 inch and 9⅝ inch casings. After placement of the fluid, the annular space is pre-pressurized to 500 psig, and then heated by circulating hot water inside the 7 inch pipe. Over a period of 2 hours, the temperature input is elevated. The pressure decreases due to the shrinkage of the monomer to polymer. The antistatic agent protects against the build up of any static charge.

While the invention has been described in detail and with reference to specific embodiments thereof, it will be apparent to one skilled in the art that various changes and modifications can be made without departing from the spirit and scope thereof.

What is claimed is:

1. A process for controlling pressure and reducing build up of static charge within a confined volume comprising:
   a) providing a volume containing a first fluid having a first pressure and a first temperature within the volume;
   b) replacing at least a portion of the first fluid within the volume with a second fluid comprising (i) at least one polymerizable monomer, and (ii) at least one antistatic agent;
   c) sealing the volume to produce a confined volume; and
   d) heating the fluid within the confined volume, such that the fluid is at a second pressure and at a second temperature,
   wherein the polymerizable monomer polymerizes at a temperature between the first temperature and the second temperature, and
   wherein the polymerizable monomer polymerizes with a decrease in pressure within the confined volume such that the second pressure is lower than had the confined volume contained the first fluid only at the second temperature.

2. The process according to claim 1, wherein the volume is an annular volume.

3. The process according to claim 1, wherein the annular volume is described by two concentric casing strings within a wellbore.

4. The process according to claim 1, wherein the first temperature is in the range of from 0° F. to 100° F.

5. The process according to claim 1, wherein the second temperature is in the range of 50° F. to 300° F.

6. The process according to claim 5, wherein the second temperature is in the range of 125° F. to 250° F.

7. The process according to claim 1, wherein the fluid within the confined volume of step (c) is at the first pressure and at the first temperature.

8. The process according to claim 1, wherein the first pressure is the maximum pressure of the first fluid within the volume of step (a), and wherein the second pressure is the maximum pressure of the fluid within the volume of step (d).

9. The process according to claim 1, wherein the first pressure of the fluid at the first temperature within the volume of step (a) is at a selected location within the volume, and wherein second pressure of the fluid at the second temperature within the volume of step (d) is at the selected location within the volume.

10. The process according to claim 1, wherein the polymerizable monomer is selected from the group consisting of acrylates and methylacrylates.

11. The process according to claim 1, wherein the polymerization of the polymerizable monomer is initiated by an initiator selected from the group consisting of an azo-type initiator, a peroxide initiator, or an ammonium persulfate/N,N,N',N'-tetramethylethylene diamine redox initiator system.

12. The process according to claim 1, wherein the antistatic agent comprises hydrophilic and hydrophobic groups.

13. The process according to claim 1, wherein the antistatic agent is a neutral and/or ionic surfactant.

14. The process according to claim 1, wherein the antistatic agent is an anionic phosphate ester.

15. The process according to claim 14, wherein the antistatic agent is selected from the group consisting of an unneutralized water-insoluble, anionic phosphate $C_8$ to $C_{16}$ alkyl ester of phosphoric acid and a fatty alcohol; a neutralized, water-soluble anionic phosphate ester with a fatty alcohol backbone; and mixtures thereof.

16. The process according to claim 1, wherein the antistatic agent is selected from the group consisting of dioctadecyldimethylammonium chloride, ditallow dimethyl ammonium chloride, dicetyldimethyl-ammonium chloride, bis-docosyldimethylammonium chloride, didodecyldimethylammonium chloride, ditallowdimethylammonium bromide, dioleoyldimethylammonium hydroxide, ditallowdiethyl-ammonium chloride, ditallowdipropylammonium bromide, ditallow-dibutylammonium fluoride, cetyldecylmethylethylammonium chloride, bis-[ditallowdimethylammonium]sulfate, tris-[ditallow-dimethylammonium]phosphate, and mixtures thereof.

17. The process according to claim 1, wherein the antistatic agent is added to the second fluid in an amount of from about 0.05 vol % to about 5 vol % of the total volume of the second fluid.

18. The process according to claim 1, wherein the antistatic agent is added to the second fluid in an amount of from about 0.1 vol % to about 1 vol % of the total volume of the second fluid.

19. A process for controlling pressure and reducing build up of static charge within the casing structure of a wellbore, comprising:
   a) providing an annular volume described by two casing strings within a wellbore and containing a first fluid having a first pressure and a first temperature at a selected location within the annular volume;
   b) replacing at least a portion of the first fluid within the annular volume with a second fluid comprising (i) a monomer which polymerizes at a second pressure and at a temperature between the first temperature and a second temperature, and (ii) at least one antistatic agent;
   c) sealing the annular volume to produce a confined volume;
   d) heating the fluid within the confined volume, such that the fluid at the selected location is at the second pressure and at the second temperature;
   wherein the second fluid is preselected such that the second pressure at the selected location is lower than the pressure at the selected location within the confined volume would have been had the confined volume contained the first fluid only at the second temperature.

20. The process according to claim 19, wherein the second pressure is no more than 50% higher than the first pressure.

21. The process according to claim 19, wherein the second pressure is no more than 30% higher than the first pressure.

22. The process according to claim 19, wherein the second pressure is no more than 15% higher than the first pressure.

23. The process according to claim 19, wherein the second pressure is equal to the first pressure.

24. The process according to claim 19, wherein the antistatic agent comprises hydrophilic and hydrophobic groups.

25. The process according to claim 19, wherein the antistatic agent is a neutral and/or ionic surfactant.

26. The process according to claim 19, wherein the antistatic agent is an anionic phosphate ester.

27. The process according to claim 26, wherein the antistatic agent is selected from the group consisting of an unneutralized water-insoluble, anionic phosphate $C_8$ to $C_{16}$ alkyl ester of phosphoric acid and a fatty alcohol; a neutralized, water-soluble anionic phosphate ester with a fatty alcohol backbone; and mixtures thereof.

28. The process according to claim 19, wherein the antistatic agent is selected from the group consisting of dioctadecyldimethylammonium chloride, ditallow dimethyl ammonium chloride, dicetyldimethyl-ammonium chloride, bis-docosyldimethylammonium chloride, didodecyldimethylammonium chloride, ditallowdimethylammonium bromide, dioleoyldimethylammonium hydroxide, ditallowdiethyl-ammonium chloride, ditallowdipropylammonium bromide, ditallaw-dibutylammonium fluoride, cetyldecylmethylethylammonium chloride, bis-[ditallowdimethylammonium]sulfate, tris-[ditallow-dimethylammonium]phosphate, and mixtures thereof.

29. The process according to claim 19, wherein the antistatic agent is added to the second fluid in an amount of from about 0.05 vol % to about 5 vol % of the total volume of the second fluid.

30. The process according to claim 19, wherein the antistatic agent is added to the second fluid in an amount of from about 0.1 vol % to about 1 vol % of the total volume of the second fluid.

31. A process for controlling pressure and reducing build up of static charge within the casing structure of a wellbore, comprising:
   a) providing an annular volume described by two casing strings within a wellbore and containing a first fluid having a first maximum pressure at a first temperature within the annular volume;
   b) replacing at least a portion of the first fluid within the annular volume with a second fluid comprising (i) a monomer which polymerizes at a temperature between the first temperature and a second temperature, and (ii) at least one antistatic agent;
   c) sealing the annular volume to produce a confined volume;
   d) heating the fluid within the confined volume to an elevated temperature relative to the first temperature, such that at least a portion of the fluid is at the second maximum pressure;
   wherein the second fluid is preselected such that a second maximum pressure is lower than the maximum pressure within the confined volume would have been had the confined volume contained the first fluid only at the elevated temperature.

32. The process according to claim 31, wherein the antistatic agent comprises hydrophilic and hydrophobic groups.

33. The process according to claim 31, wherein the antistatic agent is a neutral and/or ionic surfactant.

34. The process according to claim 31, wherein the antistatic agent is an anionic phosphate ester.

35. The process according to claim 34, wherein the antistatic agent is selected from the group consisting of an unneutralized water-insoluble, anionic phosphate $C_8$ to $C_{16}$ alkyl ester of phosphoric acid and a fatty alcohol; a neutralized, water-soluble anionic phosphate ester with a fatty alcohol backbone; and mixtures thereof.

36. The process according to claim 31, wherein the antistatic agent is selected from the group consisting of dioctadecyldimethylammonium chloride, ditallow dimethyl ammonium chloride, dicetyldimethyl-ammonium chloride, bis-docosyldimethylammonium chloride, didodecyldimethylammonium chloride, ditallowdimethylammonium bromide, dioleoyldimethylammonium hydroxide, ditallowdiethyl-ammonium chloride, ditallowdipropylammonium bromide, ditallow-dibutylammonium fluoride, cetyldecylmethylethylammonium chloride, bis-[ditallowdimethylammonium]sulfate, tris-[ditallow-dimethylammonium]phosphate, and mixtures thereof.

37. The process according to claim 31, wherein the antistatic agent is added to the second fluid in an amount of from about 0.05 vol % to about 5 vol % of the total volume of the second fluid.

38. The process according to claim 31, wherein the antistatic agent is added to the second fluid in an amount of from about 0.1 vol % to about 1 vol % of the total volume of the second fluid.

39. A process for controlling pressure and reducing build up of static charge within a confined volume comprising:
   a) providing at a first pressure and at a first temperature a volume containing a first fluid and a second fluid comprising (i) a monomer which polymerizes at a temperature between the first temperature and a second temperature, and (ii) at least one antistatic agent;
   b) sealing the volume to produce a confined volume;
   c) heating the first fluid and the second fluid within the confined volume, such that the first fluid and the second fluid are at a second pressure and at a second temperature;
   wherein the second fluid is preselected such that the second pressure is lower than had the confined volume contained the first fluid only at the second temperature.

40. The process according to claim 39, wherein the antistatic agent comprises hydrophilic and hydrophobic groups.

41. The process according to claim 39, wherein the antistatic agent is a neutral and/or ionic surfactant.

42. The process according to claim 39, wherein the antistatic agent is an anionic phosphate ester.

43. The process according to claim 42, wherein the antistatic agent is selected from the group consisting of an unneutralized water-insoluble, anionic phosphate $C_8$ to $C_{16}$ alkyl ester of phosphoric acid and a fatty alcohol; a neutralized, water-soluble anionic phosphate ester with a fatty alcohol backbone; and mixtures thereof.

44. The process according to claim 39, wherein the antistatic agent is selected from the group consisting of dioctadecyldimethylammonium chloride, ditallow dimethyl ammonium chloride, dicetyldimethyl-ammonium chloride, bis-docosyldimethylammonium chloride, didodecyldimethylammonium chloride, ditallowdimethylammonium bromide, dioleoyldimethylammonium hydroxide, ditallowdiethyl-ammonium chloride, ditallowdipropylammonium bromide, ditallow-dibutylammonium fluoride, cetyldecylmethylethylammonium chloride, bis-[ditallowdimethylammonium]sulfate, tris-[ditallow-dimethylammonium]phosphate, and mixtures thereof.

45. The process according to claim 39, wherein the antistatic agent is added to the second fluid in an amount of from about 0.05 vol % to about 5 vol % of the total volume of the second fluid.

46. The process according to claim 39, wherein the antistatic agent is added to the second fluid in an amount of from about 0.1 vol % to about 1 vol % of the total volume of the second fluid.

47. A process for controlling pressure and reducing build up of static charge within an annular volume within a casing assembly within a wellbore comprising:
   a) filling the annular volume within the casing assembly with a first fluid;
   b) replacing at least a portion of the first fluid with a second fluid comprising a polymerization system and at least one antistatic agent, within the annular volume within the casing assembly; and
   c) sealing a portion of the first fluid not replaced with the second fluid and the second fluid within the annular volume within the casing assembly.

48. The process according to claim 47, wherein the polymerization system comprises a monomer selected from the group consisting of acrylates and methylacrylates.

49. The process according to claim 47, wherein the polymerization system comprises an initiator selected from the group consisting of an azo-type initiator, a peroxide initiator, or an ammonium persulfate/N,N,N',N'-tetramethylethylene diamine redox initiator system.

50. The process according to claim 47, wherein the antistatic agent comprises hydrophilic and hydrophobic groups.

51. The process according to claim 47, wherein the antistatic agent is a neutral and/or ionic surfactant.

52. The process according to claim 47, wherein the antistatic agent is an anionic phosphate ester.

53. The process according to claim 52, wherein the antistatic agent is selected from the group consisting of an unneutralized water-insoluble, anionic phosphate $C_8$ to $C_{16}$ alkyl ester of phosphoric acid and a fatty alcohol; a neutralized, water-soluble anionic phosphate ester with a fatty alcohol backbone; and mixtures thereof.

54. The process according to claim 47, wherein the antistatic agent is selected from the group consisting of dioctadecyldimethylammonium chloride, ditallow dimethyl ammonium chloride, dicetyldimethyl-ammonium chloride, bis-docosyldimethylammonium chloride, didodecyldimethylammonium chloride, ditallowdimethylammonium bromide, dioleoyldimethylammonium hydroxide, ditallowdiethyl-ammonium chloride, ditallowdipropylammonium bromide, ditallow-dibutylammonium fluoride, cetyldecylmethylethylammonium chloride, bis-[ditallowdimethylammonium]sulfate, tris-[ditallow-dimethylammonium]phosphate, and mixtures thereof.

55. The process according to claim 47, wherein the antistatic agent is added to the second fluid in an amount of from about 0.05 vol % to about 5 vol % of the total volume of the second fluid.

56. The process according to claim 47, wherein the antistatic agent is added to the second fluid in an amount of from about 0.1 vol % to about 1 vol % of the total volume of the second fluid.

* * * * *